(12) United States Patent
Staple et al.

(10) Patent No.: US 6,750,655 B2
(45) Date of Patent: Jun. 15, 2004

(54) METHODS FOR AFFIRMING SWITCHED STATUS OF MEMS-BASED DEVICES

(75) Inventors: Bevan Staple, Longmont, CO (US); Robert Anderson, Boulder, CO (US)

(73) Assignee: PTS Corporation, San Jose, CA (US)

( * ) Notice: Subject to any disclaimer, the term of this patent is extended or adjusted under 35 U.S.C. 154(b) by 44 days.

(21) Appl. No.: 10/080,789

(22) Filed: Feb. 21, 2002

(65) Prior Publication Data

US 2003/0155932 A1 Aug. 21, 2003

(51) Int. Cl.$^7$ ............................................. G01R 31/327
(52) U.S. Cl. ...................................................... 324/415
(58) Field of Search ................................ 324/522, 525, 324/762, 601, 458, 768, 769, 418, 419, 421, 415; 359/291, 237, 224; 385/18; 333/262, 258, 105

(56) References Cited

U.S. PATENT DOCUMENTS

| | | | | |
|---|---|---|---|---|
| 6,133,807 A | * | 10/2000 | Akiyama et al. | ............ 333/101 |
| 6,240,223 B1 | * | 5/2001 | Glance | ........................ 359/634 |
| 2002/0094152 A1 | * | 7/2002 | Feierabend et al. | ............ 385/18 |
| 2002/0106144 A1 | * | 8/2002 | Garverick et al. | ............. 385/18 |
| 2003/0039016 A1 | * | 2/2003 | Vaganov | ..................... 359/198 |

OTHER PUBLICATIONS

Akiyama, Terunobu, et al., "Controlled Stepwise Motion in Polysilicon Microstructures," Journal of Microelectromechanical Systems, vol. 2, No. 3, pp. 106–110, Sep. 1993.
Ashruf, C.M.A., et al., "Galvanic porous silicon formation without external contacts," Sensors and Actuators 74, pp. 118–122, 1999.
Bean, Kenneth E., "Anisotropic Etching of Silicon," IEEE Transactions on Electron Devices, vol. ED–25, No. 10, pp. 1185–1193, Oct. 1978.
Ciarlo, Dino R., "A latching accelerometer fabricated by the anisotropic etching of (110) oriented silicon wafers," IOP Publishing, Ltd., 1992.
Kaajakari, Ville, et al., "Ultrasonic Actuation for MEMS Dormancy–Related Stiction," Proceedings of SPIE vol. 4180, 2000.
Koch, T., et al., "Anisotropically etched deep gratings for InP/InGasAsP Optical devices," J. Appl. Phys. 62 (8), Oct. 1987.
Schilling, M., et al., "Deformation–free overgrowth of reactive ion beam etched submicron structures in InP by liquid phase epitaxy," Appl. Phys. Letter 49 (12) Sep. 1986.
Tang, William C., et al., "Electrostatically Balanced Comb Drive for Controlled Levitation," Technical Digest IEEE Solid–State Sensor and Actuator Workshop, pp. 23–27, Jun. 1990.
Torcheux, L., et al., "Electrochemical Coupling Effects on the Corrosion of Silicon Samples in HF Solutions," J. Electrochem. Soc. vol. 142, No. 6, Jun. 1995.
Van Kessel, Peter F. et al, "A MEMS–Based Projection Display," Proceedings of the IEEE, vol. 86, No. 8, pp. 1687–1704, Aug. 1998.
Muller, Lilac, "Gimballed Electrostatic Microactuators with Embedded Interconnects," Dissertation, Spring 2000.
Keller, Christopher Guild, "Microfabricated Silicon High Aspect Ratio Flexures for In–Plane Motion," Dissertation, Fall 1998.

* cited by examiner

*Primary Examiner*—N. Le
*Assistant Examiner*—Amy He
(74) *Attorney, Agent, or Firm*—Townsend and Townsend and Crew LLP (57) ABSTRACT

A configuration is provided by which it may be determined whether a MEMS device is in a select state. The select state is defined by a position of a moveable element, which is moved with electrostatic forces upon activation of an electrode. The select state is detected with a sensing configuration that has first and second regions. The regions are generally separated such that they are electrically uncoupled unless the moveable element is in the position that defines the select state. A detector may be provided to indicate whether the first and second regions are coupled electrically.

24 Claims, 8 Drawing Sheets

METHODS FOR AFFIRMING SWITCHED STATUS OF MEMS-BASED DEVICES

BACKGROUND OF THE INVENTION

This application relates generally to microelectromechanical systems, and more particularly to methods for affirming a switched status of MEMS-based devices.

In recent years, increasing emphasis has been made on the development of techniques for producing microscopic systems that may be tailored to have specifically desired electrical and/or mechanical properties. Such systems are generically described as microelectromechanical systems (MEMS) and are desirable because they may be constructed with considerable versatility despite their very small size. One example of a MEMS component structure is a micromirror, which is generally configured to reflect light from at least two positions. Such micromirrors find numerous applications, including as parts of optical switches, display devices, and signal modulators, among others.

In many applications, such as may be used in fiber-optics applications, such MEMS-based devices may include hundreds or even thousands of micromirrors arranged as an array. Within such an array, each of the micromirrors should be accurately aligned with both a target and a source. Such alignment is generally complex and typically involves fixing the location of the MEMS device relative to a number of sources and targets. If any of the micromirrors is not positioned correctly in the alignment process and/or the MEMS device is moved from the aligned position, the MEMS device will not function properly.

Figure 1A:
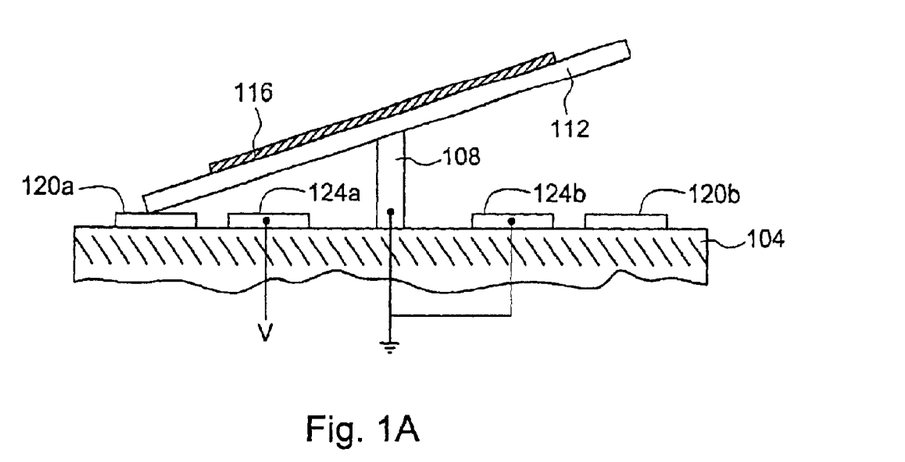
FIGS. 1A, 1B, and 1C are cross-sectional drawings of a tilting micromirror in three positions effected by actuation of different actuators.
Figure 1B:
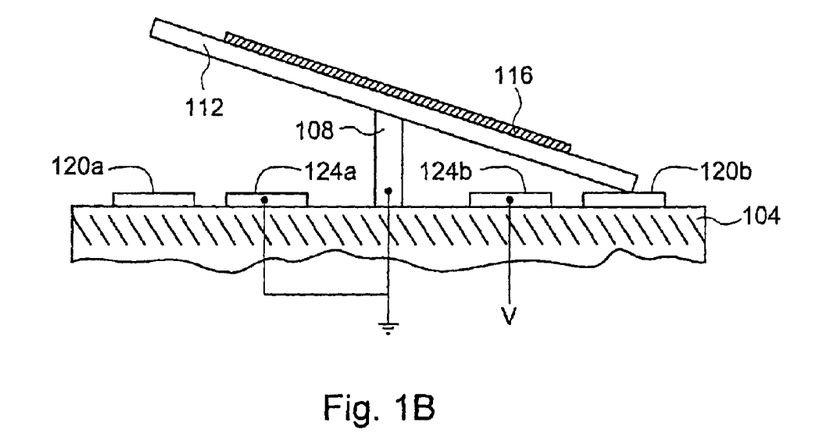
Figure 1C:
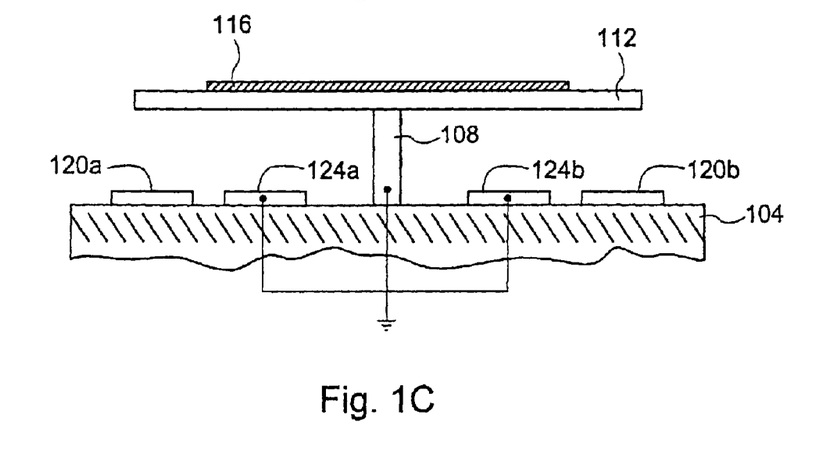

MEMS devices provide for individual movement of each of the micromirrors. An example is provided in FIGS. 1A–1C illustrating a particular MEMS micromirror structure that may take three positions. The micromirror structure illustrated in FIGS. 1A–1C is of the torsion-beam type. Each micromirror includes a reflective surface 116 mounted on a micromirror structural film 112 that is connected by a structural linkage 108 to an underlying substrate 104. Movement of an individual micromirror is controlled by energizing actuators 124a and/or 124b disposed underneath the micromirror on opposite sides of the structural linkage 108. Hard stops 120a and 120b are provided to stop the action of the micromirror structural film 112.

Energizing the actuator 124a on the left side of the structural linkage 108 causes the micromirror to tilt on the structural linkage 108 towards that side until one edge of the micromirror structural film 112 contacts the left hard stop 120a, as shown in FIG. 1A. Alternatively, the actuator 124b on the right side of the structural linkage 108 may be energized to cause the micromirror to tilt in the opposite direction, as shown in FIG. 1B. When both actuators are de-energized, as shown in FIG. 1C, the micromirror returns to a static position horizontal to the structural linkage 108. In this way, the micromirror may be moved to any of three positions. This ability to move the micromirror provides a degree of flexibility useful in aligning the MEMS device, although the alignment complexity remains significant. Sometimes hard stops 120a and 120b are not provided so that the micromirror structural film 112 is in direct contact with the substrate 104.

For telecommunications applications, optical MEMS devices are typically enclosed within a sealed hermetic enclosure and surrounded by control electronics with accompanying software. A factor in maintaining a high level of reliability for the telecommunications system includes affirming that one or more particular mirrors has switched to the desired position when commanded to route a particular optical signal. One approach that has been proposed to accomplish this is to monitor and detect modulations in the optical power of an optical signal during switching. Other proposals have exploited the fact that in some applications each MEMS device is associated with a particular wavelength, permitting an optical interrogator to be installed for detecting that particular wavelength, and thereby determining that the MEMS device has been switched. A more direct nonoptical approach attempts to sense the MEMS device capacitively after switching, but such sensing is problematic without monolithic integrated on-chip electronics.

There is accordingly a need in the art for methods that permit affirming the switched status of MEMS-based devices.

BRIEF SUMMARY OF THE INVENTION

Embodiments of the invention are thus directed to a MEMS device and a method for operating the MEMS device to determine whether it is in a select state. The select state is defined by a position of a moveable element, which is moved with electrostatic forces upon activation of an electrode. The moveable element may be conductive or semiconductive in different embodiments. The select state is detected with a sensing configuration that has first and second regions. The regions are generally separated such that they are electrically uncoupled unless the moveable element is in the position that defines the select state. In some embodiments, a detector may be provided to indicate whether the first and second regions are so coupled electrically.

The sensing configuration may be organized differently in a number of embodiments. For example, in one embodiment, the sensing configuration comprises a transistor, which may be a field-effect transistor or a bipolar junction transistor. Where the sensing configuration comprises a field-effect transistor, the first region comprises a source of the field-effect transistor and the second region comprises a drain of the field-effect transistor. The moveable element acts as a gate that couples the source and drain electrically when in the select state. Where the sensing configuration comprises a bipolar junction transistor, the first region comprises an emitter of the bipolar junction transistor and the second region comprises a collector of the bipolar junction transistor. The moveable element acts as a base that couples the emitter and collector electrically when in the select state.

In another embodiment, the first and second regions comprise first and second waveguide ports. The impedance between the waveguide ports is reduced when the moveable element is positioned so that the device is in the select state, and the reduced impedance may be detected.

In a further embodiment, the moveable element comes into contact with both the first and second regions when position so that the device is in the select state. A current in the completed circuit between the regions may be detected.

In certain embodiments, the MEMS device comprises a microstructure for steering light. The microstructure comprises a substrate and a structural linkage connected with the substrate to support the moveable element. The position of the moveable element orients a reflective coating off of which light may be reflected. The sensing configuration may be formed within the substrate.

A plurality of such MEMS devices may also be configured as an array, and such an array may be comprised by a wavelength router for optical applications. In one embodiment, the first region of each of the devices and the electrode of each of the devices are electrically coupled with a dynamic refresh driver. The second regions of the devices are electrically coupled with one another. Such a configuration limits the number of bond pads that need be included with the structure.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and is enclosed in parentheses to denote one of multiple similar components. When reference is made to a reference numeral without specification to an existing sublabel, it is intended to refer to all such multiple similar components.

DETAILED DESCRIPTION OF THE INVENTION

1. Introduction

Embodiments of the invention are directed to methods for affirming the switched status of MEMS-based devices. In the illustrated embodiments, tiltable micromirrors are used as examples, but it will be understood that the methods of the invention apply more generally to other types of MEMS devices that effect different switched states through motion. The MEMS device is fabricated over a substrate within or over which a sensing configuration is provided. When the MEMS device is in any but a select state, the sensing configuration is inactive, but when the MEMS device is in the select state, the sensing configuration is active. Accordingly, activity of the sensing configuration indicates that the MEMS device is in the select configuration. In different embodiments, the sensing configuration may comprise a transistor, such as a field-effect transistor or a bipolar junction transistor, a radio-frequency coupling sensor, or an electrical-continuity sensor. In certain embodiments, the exemplified tilting micromirror structures may be readily incorporated into optical devices, such as in a wavelength router that uses optical switching to effect different states.

As will be clear to those of skill in the art from the following description, embodiments of the invention that use micromirror states may be adapted to different types of micromirror configurations, including cantilever micromirrors and torsion-beam micromirrors. It is noted that herein micromirror configurations are shown schematically in the figures only for illustrative purposes. As will be understood by those of skill in the art, for designs that do not use mechanical travel limits, the point of rotation of the micromirror structural film should be selected so that in static micromirror configurations both the forces on the structural film and the torques about the point of tilting cancel.

2. Transistor Sensing Configurations

In a first embodiment, the sensing configuration comprises a transistor, including either a field-effect transistor or a bipolar junction transistor. An illustration is provided in FIGS. 2A and 2B. In both of those figures, one half of a torsion-beam micromirror structure similar to that illustrated in FIGS. 1A–1C is shown. The reflective surface 216 used to provide the micromirror with its optical characteristics is formed on a micromirror structural film 112 that is connected by a structural linkage 208 to an underlying substrate. The micromirror may be tilted through activation of an electrode 224 positioned on the substrate under the micromirror structural film 212. When the electrode 224 is activated, it tilts downwards and encounters the hard stop 220 or the substrate depending on whether a hard stop is included. This tilted position is considered to be the select position that the transistor sensing configuration is intended to detect and affirm.

Figure 2A:
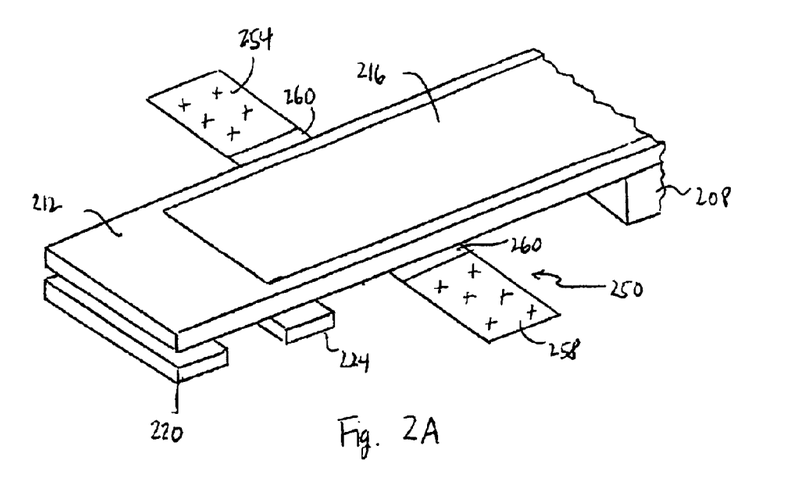
FIGS. 2A and 2B are perspective drawings of a tilting micromirror illustrating an embodiment of the invention that uses capacitively coupled field effects to affirm switching.
Figure 2B:
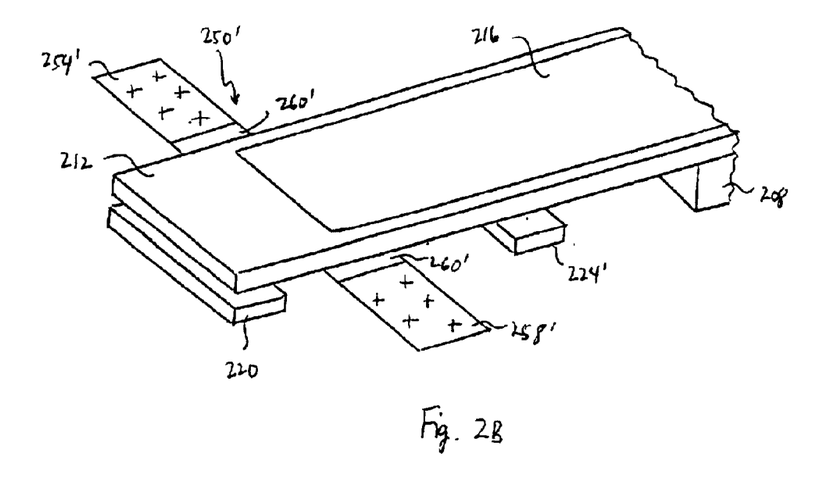

Formed within the substrate is a field-effect transistor 250 having a source region 254, a channel region 260, and a drain region 258. In the specific arrangement of FIG. 2A, the field-effect transistor 250 is positioned closer to the structural linkage 208 than is the electrode 224. An alternative arrangement is shown in FIG. 2B, in which a field-effect transistor 250' having a source region 254', a channel region 260', and a drain region 258' is positioned farther from the structural linkage 208 than is the electrode 224'. In either embodiment, the field-effect transistor 250 or 250' is formed so that the channel region 260 or 260' is substantially under the micromirror structural film 212.

The micromirror structural film 212 will generally be fabricated from an electrically conductive or semiconductive material, such as aluminum, polysilicon, or silicon. It provides an example of a more general MEMS configuration in which a moveable element is suspended above the substrate over the channel region of the transistor. The source and drain regions are shown in the illustrations as being doped with positive charge carriers, although they may be doped with negative charge carriers in alternative embodiments. The moveable element functions as a suspended gate for the field-effect transistor so that current only flows between the source and drain regions when the moveable element is in the select state.

Figure 3A:
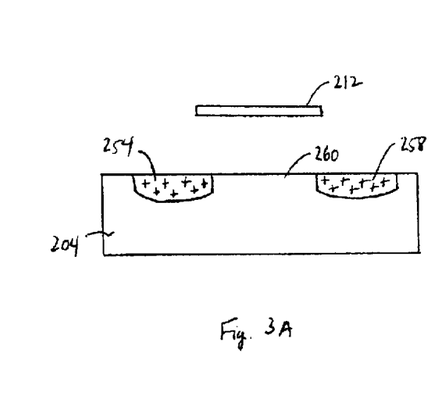
FIGS. 3A and 3B are cross-sectional drawings of a field-effect transistor used in the embodiments of FIGS. 2A and 2B.
Figure 3B:
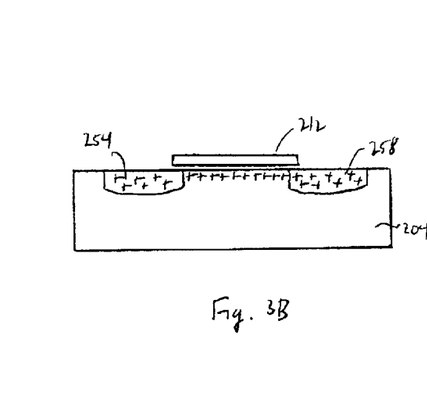

This is illustrated with the end views provided in FIGS. 3A and 3B, in which the source region 254 and drain region 258 are explicitly shown formed in the substrate 204. When the moveable element, shown as the micromirror structural film 212, is suspended above the substrate 204 as in FIG. 3A, the channel region 260 of the field-effect transistor is effectively closed and no current flows between the source region 254 and drain region 258 even under a drain bias. The micromirror may be switched to the select state through activation of the electrode 224, causing the micromirror structural film 212 to tilt downwards in response to a resulting electrostatic force. In some embodiments, the suspended gate embodied by the micromirror structural film 212 comes close to, without touching, the channel region 260 when in the select state. The separation between the suspended gate and the channel region 260 may be less than 1 µm. Such a position may be achieved as a result of the electrostatic characteristics of the MEMS device so that such a proximate position corresponds to an electrostatically stable position for the suspended gate. Alternatively, such a position may be achieved with mechanical constraints such as the hard stop 220.

In one embodiment, the voltage applied between the electrode 224 and the micromirror structural film 212 includes an ac signal imposed on it. The ac signal may comprise a high-frequency ac signal. When the MEMS device is in the select state, as shown in FIG. 3B, the suspended gate produces an electric field from the imposed ac signal that capacitively couples into the channel region 260. This field modulates the channel region's conductance, thereby changing the output drain current, by producing excess mobile charges in the channel region 260 connecting the source region 254 with the drain region 258. In this select state, the field-effect transistor is active and current flows from the source region 254 to the biased drain region 258 where it may be detected. Activation of the field-effect transistor in this manner thus acts to indicate that the moveable element is in the select state.

Fabrication of the field-effect transistor within the substrate 204 may be readily incorporated into standard MEMS processing techniques, including, for example MUMPS and SUMMiT processing. Such incorporation requires only a single additional mask level for implantation of the source region 254 and drain region 258 into the substrate before the MEMS fabrication of the MEMS device begins. In addition, it is possible to use a construction in certain embodiments in which only a single additional bond pad is needed, even for an array of such MEMS devices; such a construction is discussed in Section 5 below. In some embodiments, the source region 254 and drain region 258 may be doped to achieve specifically desired characteristics. For example, the danger of electrical breakdown of the field-effect transistor may be mitigated by doping the source and drain regions 254 and 258 to avoid breakdown. Similarly, the source and drain regions 254 and 258 may be doped to compensate for thermal budgets expected during the MEMS fabrication.

In an alternative embodiment, the field-effect transistor is substituted with a bipolar junction transistor to act as the sensing configuration. In such an instance, the source and drain regions 254 and 258 are replaced respectively with emitter and collector regions by suitable doping. The moveable element in such an embodiment functions as a suspended base, which may be moved to a position proximate the collector and emitter regions in the same fashion as illustrated in FIGS. 3A and 3B. While a field-effect transistor is controlled by the gate voltage, a bipolar junction transistor is instead controlled by a base current. The position of the moveable element is thus used to modulate the base current of the bipolar transistor. When the moveable element is in the select state, the resulting current flow from the emitter to the collector may be sensed and used to affirm the desired status of the MEMS device.

3. Radio-Frequency-Coupling Sensing Configuration

Figure 4:
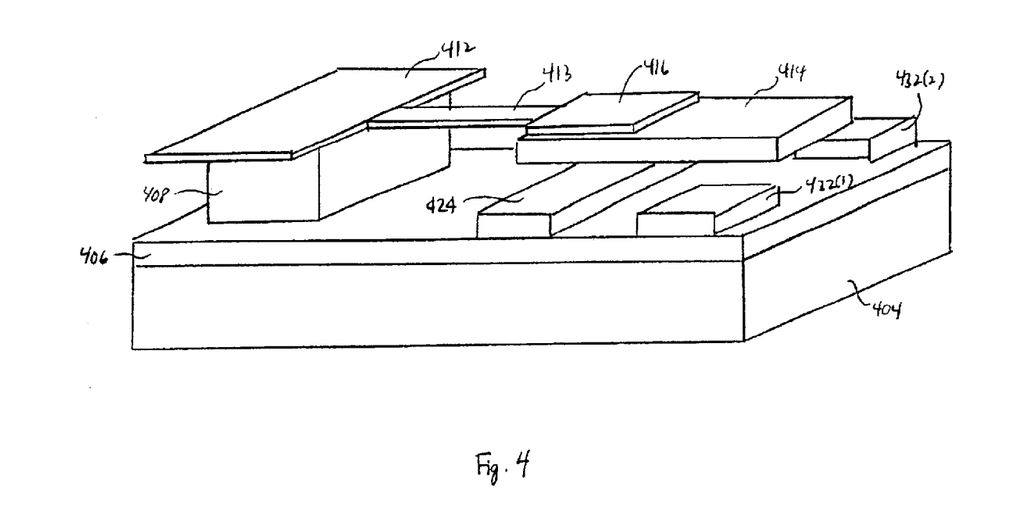
FIG. 4 is a perspective drawing of a tilting micromirror illustrating an embodiment of the invention that uses radio-frequency coupling to affirm switching.

FIG. 4 provides an illustration of another embodiment in which the sensing configuration uses radio-frequency coupling. To illustrate the general applicability of the sensing configurations to different types of MEMS structures, FIG. 4 provides an example in which the sensing configuration is applied to a cantilever-type tiltable micromirror. The MEMS structure is formed over a substrate, which may include a structural support layer 406. A structural film 412 is connected with the structural support layer 406 through a structural linkage 408. The micromirror includes a reflective surface 416 mounted on a support 414 that is connected with the structural film 412 through linkage 413. Motion of the micromirror from a quiescent state to a select state is controlled with an electrode 424 formed on the support layer 406 and positioned under the support 414. The support 414 will generally be formed of a conductive or semiconductive material so that it acts as the moveable element within the MEMS device. Application of a voltage to the electrode 424 causes an electrostatic attraction between the support and the electrode 424 that causes the linkage to bend to an equilibrium position that defines the select state.

The sensing configuration includes a first waveguide port 432 (1) and a second waveguide port 432(2) that are separated from each other on the support layer 406. In one embodiment, the waveguide ports 432 comprise coplanar waveguides. A determination of whether the moveable element is in the select state may be effected by applying a high-frequency rf signal to one of the waveguide ports 432 and measuring an impedance across the ports 432. When the support 414 is in the quiescent state, there is a high impedance between the ports. Conversely, this impedance is low when the support 414 is in the select state since the proximity of the support 414 to the waveguide ports 432 permits capacitive coupling between the ports. Thus, the state of the MEMS device may be determined through application of an rf signal to one of the waveguide ports 432 and measuring the impedance between the ports 432; an impedance below a predetermined threshold value indicates that the MEMS device is in the select state.

4. Electrical-Continuity Sensing Configuration

Figure 5:
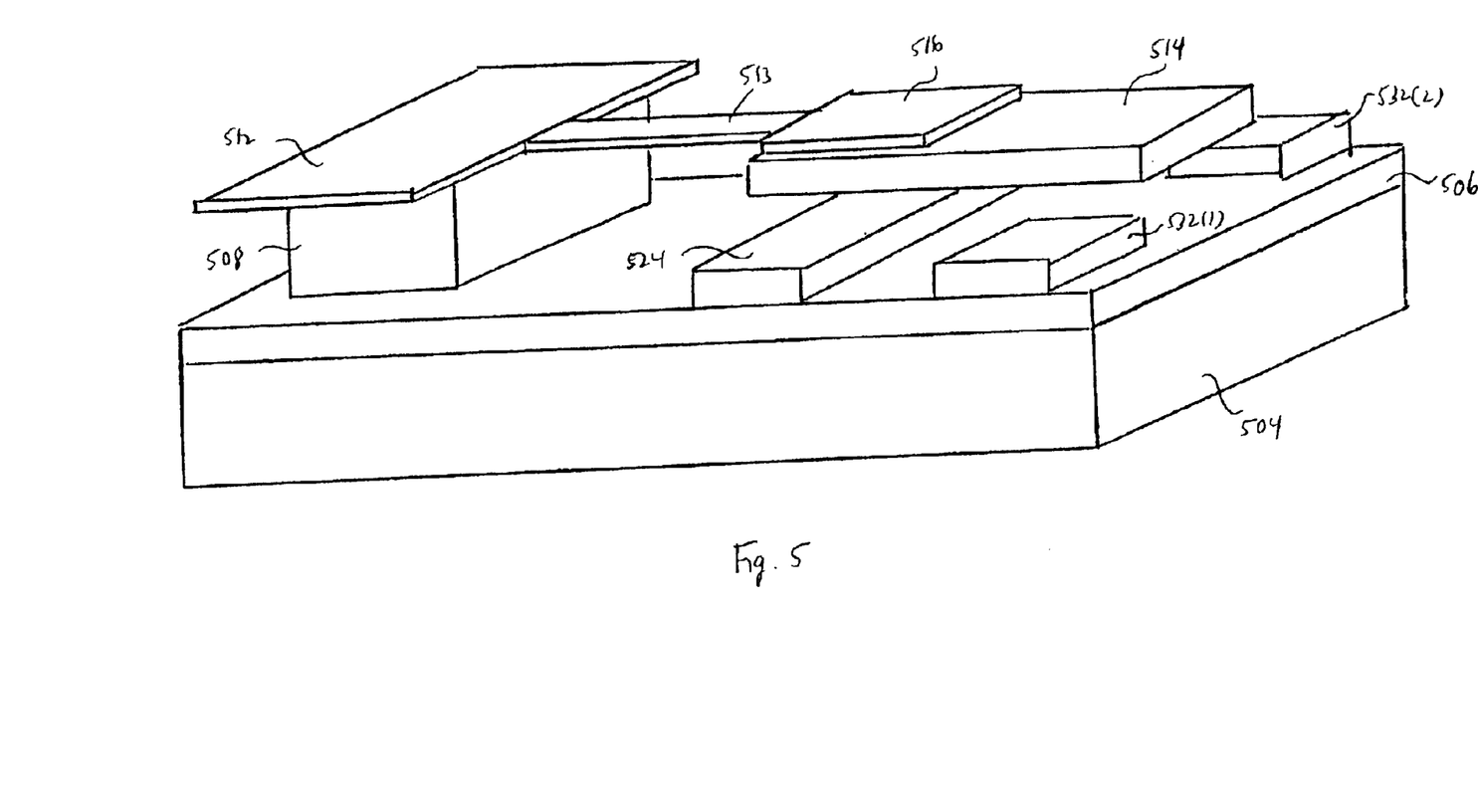
FIG. 5 is a perspective drawing of a tilting micromirror illustrating an embodiment of the invention that uses electrical continuity between separated ports to affirm switching.

FIG. 5 provides an illustration of still a further embodiment in which the sensing configuration uses electrical continuity. This embodiment is also illustrated with the use of a cantilever-type micromirror arrangement and is similar in structure to the embodiment described with respect to FIG. 4. The micromirror assembly is supported by a structural support layer 506 formed on a substrate 504. A structural linkage 508 connects the structural support layer 506 with a structural film 512 that is connected with a further linkage 513 to a support 514. A reflective surface 516 is formed over the support 514. The support 514 will generally be fabricated with an electrically conductive or semiconductive material so that it functions as the moveable element. The support 514 is moved by electrostatic forces resulting from application of a voltage to an electrode 524 formed under the support 514.

The sensing configuration comprises two separated sensing electrodes 532. To determine the state of the MEMS device, as defined by the position of the moveable element, i.e. of support 514, an electrical current is supplied to one of the sensing electrodes 532 and a current is measured at the other sensing electrode. The MEMS device is configured in this embodiment so that in the select state, the moveable element is in contact with both of the sensing electrodes 532.

Accordingly, in the select state, a circuit is completed between the sensing electrodes 532 and the current applied at the first sensing electrode 532(1) may be detected at the second sensing electrode 532(2). This state is thus distinguished from the quiescent state, for which no completed circuit exists.

5. Dynamic Refresh Driver

In some embodiments, an array of MEMS devices may be used. In such embodiments, it is desirable periodically to affirm the state of each of the MEMS devices to ensure that they are in the desired positions, and to take corrective action if one of the MEMS devices is not in its desired position. Accordingly, in one embodiment a dynamic refresh driver is coupled electrically with the array of MEMS devices. The use of a dynamic refresh driver is described generally in copending, commonly assigned U.S. patent application Ser. No. 09/880,230 ("the '230 application"), entitled "MICROMIRROR ARRAY HAVING ADJUSTABLE ANGLES," filed Jun. 12, 2001 by Robert Anderson, Bevan Staple, and Richard Roth, the entire disclose of which is herein incorporated by reference for all purposes.

In embodiments that use a dynamic refresh driver, the electrodes used to define positions for the moveable elements in the MEMS devices are energized sequentially throughout the array. Thus, only one such electrode in the array is energized at any one time. The period of sequentially moving through all electrodes in the array is chosen to be sufficiently small that the reaction of each moveable element as a result of interruption in activation of its associate electrode is negligible.

One advantage of using the dynamic refresh driver is that the implementation of the sensing configurations for all of the MEMS devices in the array may be achieved with only a single additional bond pad. For example, a common feature of the embodiments described above is that each of the sensing configurations includes at least two regions that are electrically coupled only when the moveable element is in the select state. Examples of the two regions include: source and drain regions for a field-effect transistor; emitter and collector regions for a bipolar-junction transistor; first and second waveguide ports susceptible to rf coupling; or first and second sensing electrodes that may be used to complete a circuit. In these embodiments, for each of the MEMS devices in the array, a first of the regions may be connected with the electrode that effects movement of the moveable element. Simultaneous application of a voltage to the electrode and to the first region will not interfere with the operation of either. The use of the dynamic refresh driver then permits all of the second regions for the MEMS devices to be connected electrically. The resulting reduction in the number of bond pads that would otherwise be required is significant since the size of a MEMS die needed in fabricating large device arrays is often dictated primarily by the number of bond pads needed.

Figure 6A:
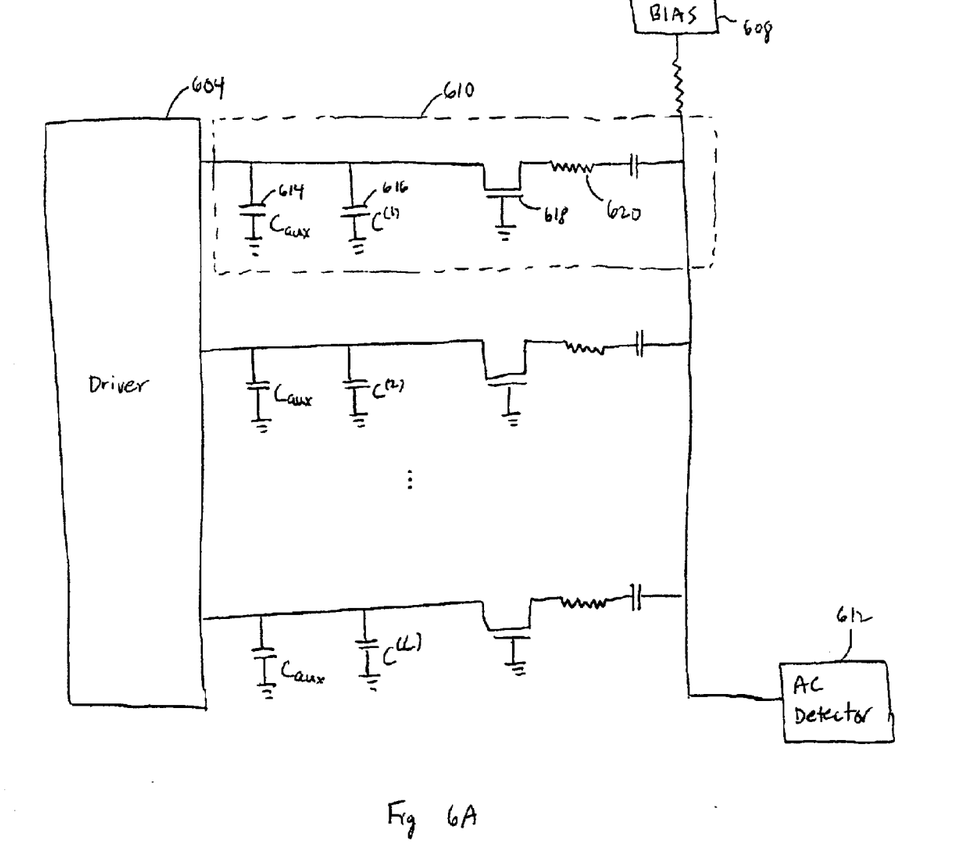
FIG. 6A is a circuit diagram of an equivalent circuit for a dynamic-refresh mode of operation used with embodiments of the invention.

An equivalent circuit diagram is shown in FIG. 6A for the specific embodiment where the sensing configurations comprise field-effect transistors for each of the MEMS devices. The circuit is shown for an array having L sensing configurations. In instances where the MEMS devices have only a single select state, such as in the case of cantilever-type micromirrors, L may be equal to the number of MEMS devices. In instances where the MEMS devices have two select states, such as in the case of torsion-beam micromirrors, L may be equal to twice the number of MEMS devices. More generally, L corresponds to the total number of select states that may be achieved throughout the array, including embodiments where different MEMS devices in the array may have different numbers of select states.

In the circuit diagram, driver 604 is connected electrically with a plurality L of circuits 610 corresponding to each of the sensing configurations. The electrode used to effect a particular select state is indicated by a capacitance $C^{(1 \cdots L)}$ 616 and the sensing configuration is indicated by field-effect transistor 618. The source region of the field-effect transistor 618 is coupled with the electrode and the drain regions of all of the field-effect transistors 608 are coupled into a summing circuit. Each of the electrodes is further coupled with driver 604, which is configured to interrogate each of the circuits 610 periodically. The summing circuit is biased with bias 608 and an ac detector 612 is coupled with the drain regions of the field-effect transistors 618 to detect ac signals. If the electrode has a small capacitance $C^{(1 \cdots L)}$, an auxiliary capacitance $C_{aux}$ 614 may be added to prevent excessive bleeding of current; alternatively, the interrogation frequency may be increased sufficiently to accommodate current variations. In one embodiment, the auxiliary capacitance $C_{aux}$ is of the order of 100 times the native capacitance $C^{(1 \cdots L)}$ of the electrode. A resistance 620 may be provided to couple the field-effect transistor 618 to the summing circuit.

In operation, the driver 604 periodically interrogates each of the circuits 610 as described in the '230 application, permitting the functions described in the '230 application to be performed on each of the MEMS devices. In addition, if a particular MEMS device is in the select state, the field-effect transistor 618 will be turned on so that current will flow through the resistor into the summing circuit, creating a detectable voltage difference. In one embodiment, such detection is simplified by adding an ac spike on the voltage characteristics of the signals provided by the driver, allowing the ac spike to couple to the ac detector 612 when the MEMS device is in the select state.

Figure 6B:
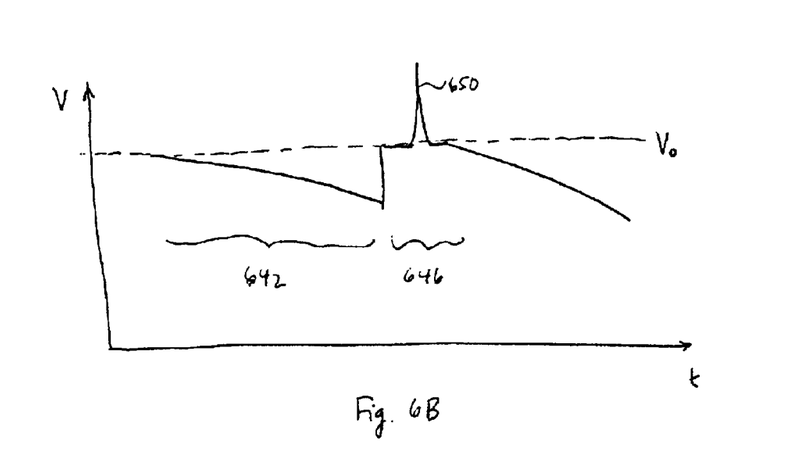
FIG. 6B is a schematic illustration of a voltage signal used with the dynamic-refresh operation mode.

The time dependence of a typical voltage profile for one of the circuits 610 is thus shown in FIG. 6B. During the time period 642 when the driver 604 is interrogating other circuits, the voltage level may drop somewhat. During the time period 646 when the driver 604 is interrogating the particular circuit 610, it first raises the dropped voltage level back to its desired level $V_0$, as described in the '230 application. The driver 604 also provides the ac spike 650 on the voltage profile for coupling with the ac detector 612. Correlation of a detection of the ac spike by the ac detector 612 with the known interrogation time period for each of the circuits 610 is sufficient to identify which of the field-effect transistors 618 is on. Accordingly, the entire array of MEMS devices may be monitored to ensure that they are in their desired states.

6. Fiber-Optics Applications a. Wavelength Router

An array of tilting micromirrors that include sensing configurations according to the embodiments described above, and their equivalents, may be used in numerous applications as parts of optical switches, optical filters, optical attenuators, optical cross-connects, display devices, and signal modulators, among others. One particular application of such tilting micromirrors is as optical switches in a wavelength router such as may be used in fiber-optic telecommunications systems. One such wavelength router is described in detail in the copending, commonly assigned U.S. patent application, filed Nov. 16, 1999 and assigned Ser. No. 09/442,061, entitled "Wavelength Router," which is herein incorporated by reference in its entirety, including the Appendix, for all purposes. The various micromirror embodiments, including micromirror arrays coupled with a dynamic refresh driver, may be used in that wavelength router or may be incorporated into other wavelength routers as optical switches.

Fiber-optic telecommunications systems are currently deploying a relatively new technology called dense wavelength division multiplexing (DWDM) to expand the capacity of new and existing optical fiber systems to help satisfy the steadily increasing global demand for bandwidth. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are performed with a wavelength router used with the current invention by an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

Wavelength routing functions may be performed optically with a free-space optical train disposed between the input ports and the output ports, and a routing mechanism. The free-space optical train can include air-spaced elements or can be of generally monolithic construction. The optical train includes a dispersive element such as a diffraction grating, and may be configured in one-pass, two-pass, or four-pass configurations. The routing mechanism includes one or more routing elements and cooperates with the other elements in the optical train to provide optical paths that couple desired subsets of the spectral bands to desired output ports. The routing elements are disposed to intercept the different spectral bands after they have been spatially separated by an encounter with the dispersive element.

Figure 7A:
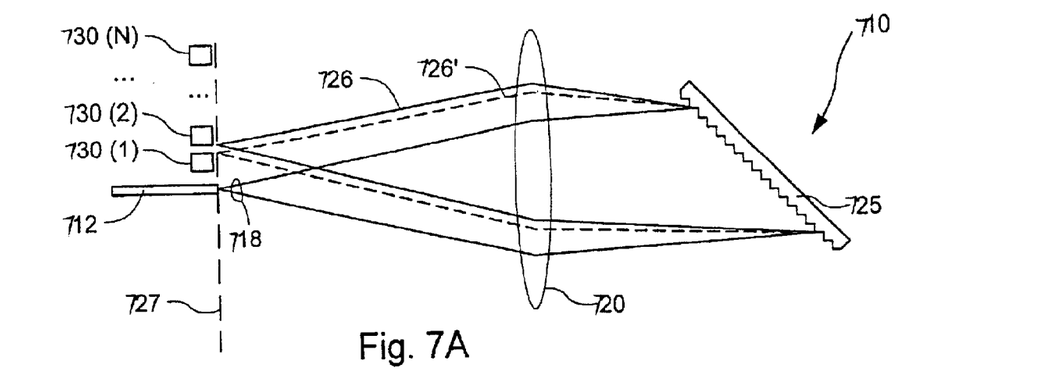
FIGS. 7A, 7B, and 7C are schematic top, side, and end views, respectively, of one embodiment of a wavelength router that uses spherical focusing elements.
Figure 7B:
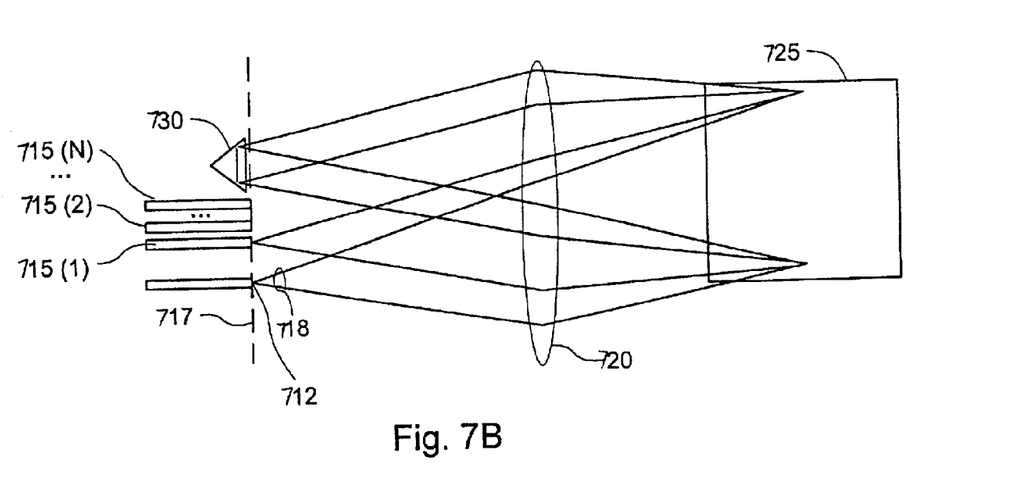
Figure 7C:
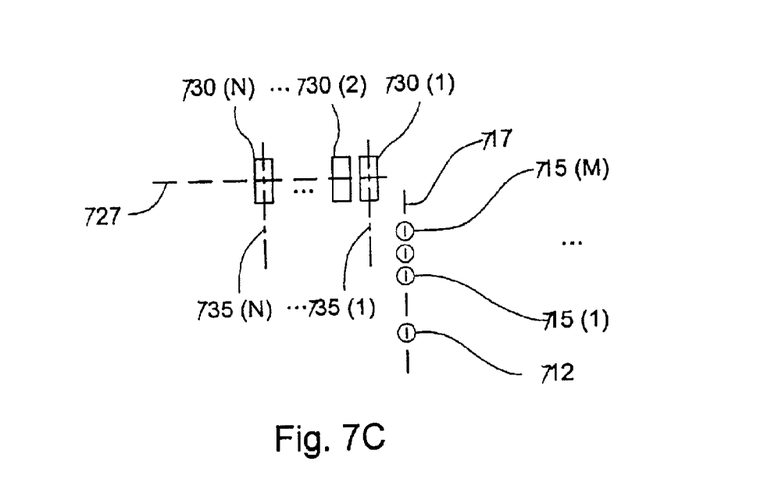

FIGS. 7A, 7B, and 7C are schematic top, side, and end views, respectively, of one embodiment of a wavelength router 710 that may be considered to have a four-pass configuration. Its general functionality is to accept light having a plurality N of spectral bands at an input port 712, and to direct subsets of the spectral bands to desired ones of a plurality M of output ports, designated 715(1) . . . 715(M). The output ports are shown in the end view of FIG. 7C as disposed along a line 717 that extends generally perpendicular to the top view of FIG. 7A. Light entering the wavelength router 710 from input port 712 forms a diverging beam 718, which includes the different spectral bands. Beam 718 encounters a lens 720 that collimates the light and directs it to a reflective diffraction grating 725. The grating 725 disperses the light so that collimated beams at different wavelengths are directed at different angles back towards the lens 720.

Two such beams are shown explicitly and denoted 726 and 726', the latter drawn in dashed lines. Since these collimated beams encounter the lens 720 at different angles, they are focused towards different points along a line 727 in a transverse plane extending in the plane of the top view of FIG. 7A. The focused beams encounter respective ones of a plurality of retroreflectors that may be configured as the micromirror optical switches described above to include sensing configurations. The array of retroreflectors is designated 730(1) . . . 730(N) and is located near the transverse plane. The beams are directed back, as diverging beams, to the lens 720 where they are collimated, and directed again to the grating 725. On the second encounter with the grating 725, the angular separation between the different beams is removed and they are directed back to the lens 720, which focuses them. The retroreflectors 730 may be configured to send their intercepted beams along a reverse path displaced along respective lines 735(1) . . . 735(N) that extend generally parallel to line 717 in the plane of the side view of FIG. 7B and the end view of FIG. 2C, thereby directing each beam to one or another of output ports 715.

Figure 8A:
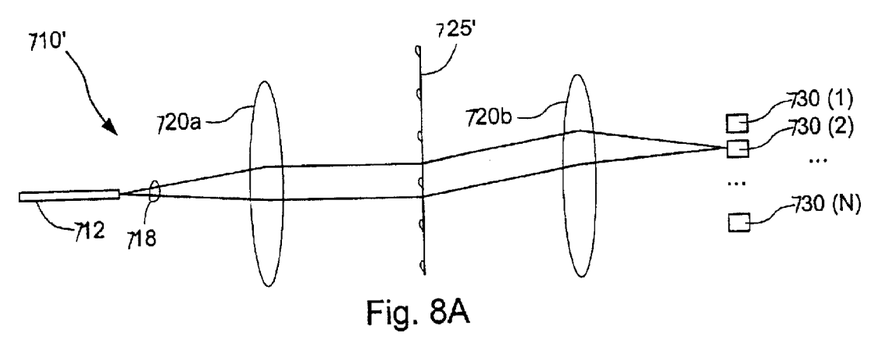
FIGS. 8A and 8B are schematic top and side views, respectively, of a second embodiment of a wavelength router that uses spherical focusing elements.
Figure 8B:
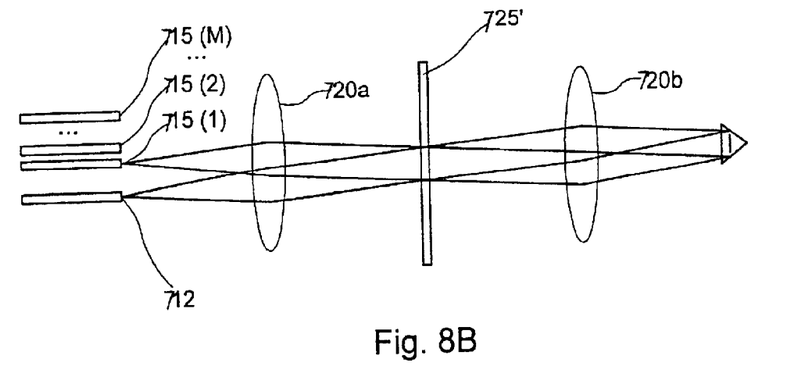

Another embodiment of a wavelength router, designated 710', is illustrated with schematic top and side views in FIGS. 8A and 8B, respectively. This embodiment may be considered an unfolded version of the embodiment of FIGS. 7A–7C, and thus corresponds to an example of a two-pass router. Light entering the wavelength router 710' from input port 712 forms diverging beam 718, which includes the different spectral bands. Beam 718 encounters a first lens 720a, which collimates the light and directs it to a transmissive grating 725'. The grating 725' disperses the light so that collimated beams at different wavelengths encounter a second lens 720b, which focuses the beams. The focused beams are reflected by respective ones of plurality of retroreflectors 730, which may also be configured as described above to include sensing configurations, as diverging beams, back to lens 720b. The lens collimates the beams and directs them to grating 725'. On the second encounter, the grating 725' removes the angular separation between the different beams, which are then focused in the plane of output ports 715 by lens 720a.

Figure 9:
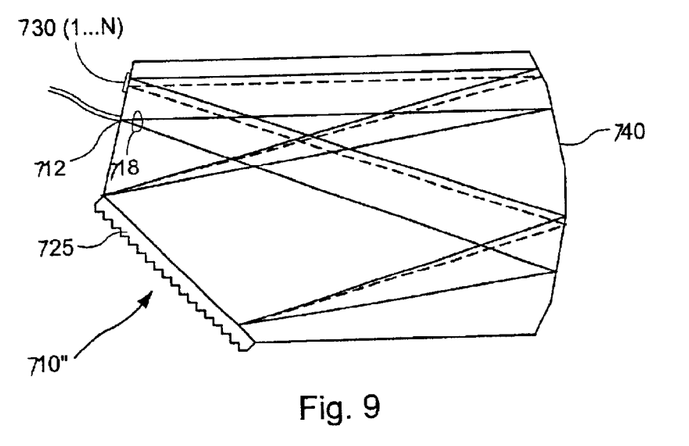
FIG. 9 is a schematic top view of a third embodiment of a wavelength router that uses spherical focusing elements.

A third embodiment of a wavelength router, designated 710", is illustrated with the schematic top view shown in FIG. 9. This embodiment is a further folded version of the embodiment of FIGS. 7A–7C, shown as a solid glass embodiment that uses a concave reflector 740 in place of lens 720 of FIGS. 7A–7C or lenses 720a and 720b of FIGS. 8A–8B. Light entering the wavelength router 710" from input port 712 forms diverging beam 718, which includes the different spectral bands. Beam 718 encounters concave reflector 740, which collimates the light and directs it to reflective diffraction grating 725, where it is dispersed so that collimated beams at different wavelengths are directed at different angles back towards concave reflector 740. Two such beams are shown explicitly, one in solid lines and one in dashed lines. The beams then encounter retroreflectors 730 and proceed on a return path, encountering concave reflector 740, reflective grating 725', and concave reflector 740, the final encounter with which focuses the beams to the desired output ports. Again, the retroreflectors 730 may be configured as described above to include sensing configurations.

b. Micromirror Optical-Switch Retroreflector Array Implementations

Figure 10A:
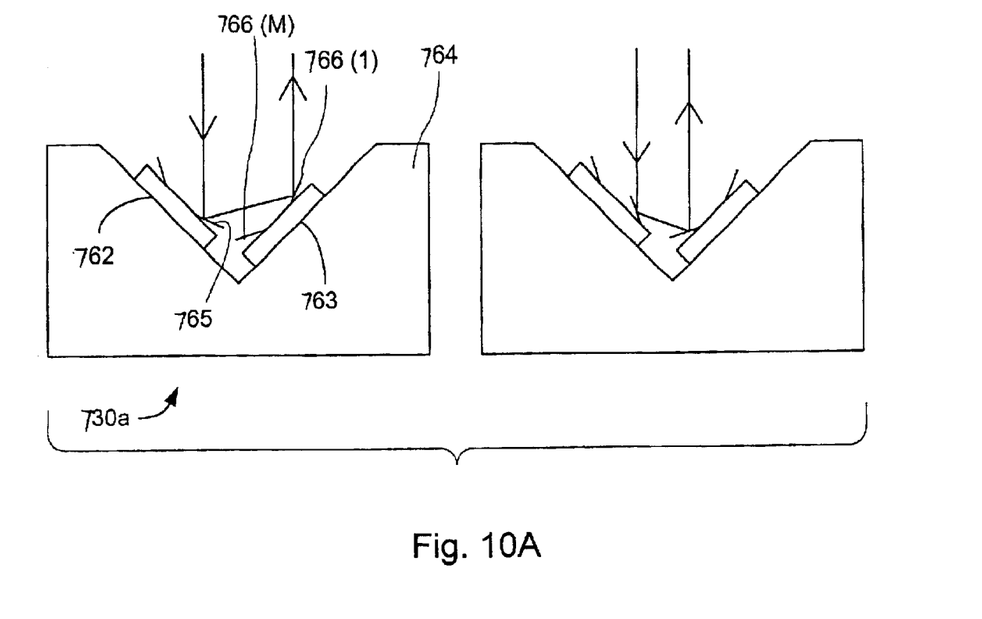
FIGS. 10A and 10B are side and top views of an implementation of a micromirror retroreflector array.
Figure 10B:
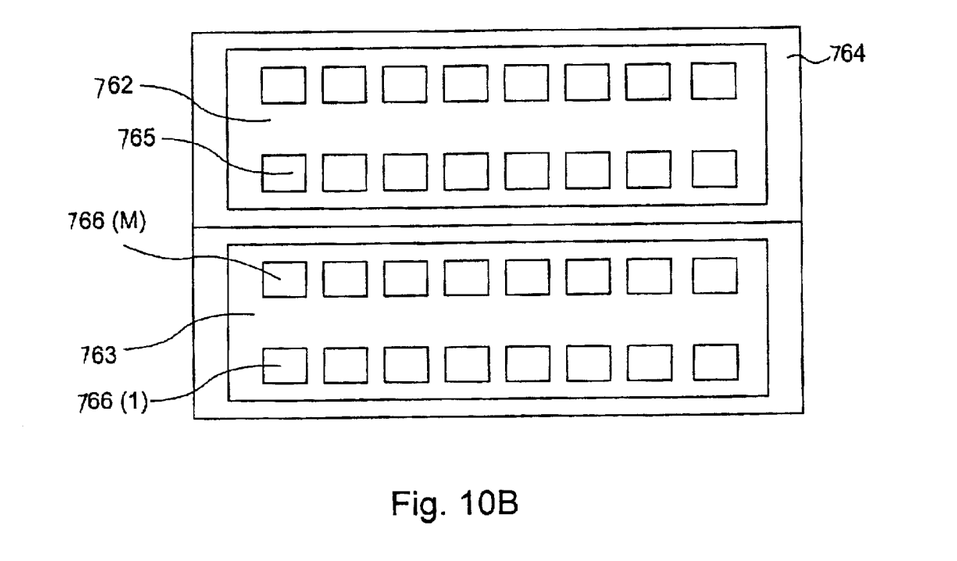

FIG. 10A shows schematically the operation of a retroreflector, designated 730a, that uses micromirror optical switches having sensing configurations. FIG. 10B is a top view. A pair of micromirror arrays 762 and 763 is mounted to the sloped faces of a V-block 764. A single micromirror 765 in micromirror array 762 and a row of micromirrors 766(1 . . . M) in micromirror array 763 define a single retroreflector. Micromirror arrays may conveniently be referred to as the input and output micromirror arrays, with the understanding that light paths are reversible. The left portion of the figure shows micromirror 765 in a first orientation so as to direct the incoming beam to micromirror 766(1), which is oriented 90° with respect to micromirror 765's first orientation to direct the beam back in a direction opposite to the incident direction. The right half of the figure shows micromirror 765 in a second orientation so as to direct the incident beam to micromirror 766(M). Thus, micromirror 765 is moved to select the output position of the beam, while micromirrors 766(1 . . . M) are fixed during normal operation. Micromirror 765 and the row of micromirrors 766(1 . . . M) can be replicated and displaced in a direction perpendicular to the plane of the figure. While micromirror array 762 need only be one-dimensional, it may be convenient to provide additional micromirrors to provide additional flexibility.

In one embodiment, the micromirror arrays are planar and the V-groove has a dihedral angle of approximately 90° so that the two micromirror arrays face each other at 90°. This angle may be varied for a variety of purposes by a considerable amount, but an angle of 90° facilitates routing the incident beam with relatively small angular displacements of the micromirrors. In certain embodiments, the input micromirror array has at least as many rows of micromirrors as there are input ports (if there are more than one), and as many columns of mirrors as there are wavelengths that are to be selectably directed toward the output micromirror array. Similarly, in some embodiments, the output micromirror array has at least as many rows of micromirrors as there are output ports, and as many columns of mirrors as there are wavelengths that are to be selectably directed to the output ports.

In a system with a magnification factor of one-to-one, the rows of micromirrors in the input array are parallel to each other and the component of the spacing from each other along an axis transverse to the incident beam corresponds to the spacing of the input ports. Similarly, the rows of micromirrors in the output array are parallel to each other and spaced from each other (transversely) by a spacing corresponding to that between the output ports. In a system with a different magnification, the spacing between the rows of mirrors would be adjusted accordingly.

This description of an array arrangement that may be used to configure retroreflectors for use in a wavelength router are intended to be exemplary. Other array arrangements may be used as may other micromirror configurations. Some such alternatives are described in copending, commonly assigned U.S. patent application Ser. No. 09/941,998, entitled "MULTIMIRROR STACK FOR VERTICAL INTEGRATION OF MEMS DEVICES IN TWO-POSITION RETROREFLECTORS," filed Aug. 28, 2001 by Frederick Kent Copeland, the entire disclosure of which is herein incorporated by reference.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for determining whether a MEMS device is in a select state defined by a position of a moveable element comprised by the MEMS device and formed over a substrate comprised by the MEMS device, the method comprising:

changing a voltage of a first region of a sensing configuration formed within the substrate; and measuring a second region of the sensing configuration formed within the substrate, wherein the first and second regions are electrically coupled when the MEMS device is in the select state and electrically uncoupled when the MEMS device is not in the select state.

2. The method recited in claim 1 wherein the sensing configuration comprises a transistor.

3. The method recited in claim 2 wherein the sensing configuration comprises a field-effect transistor having a source region corresponding to the first region and a drain region corresponding to the second region.

4. The method recited in claim 2 wherein the sensing configuration comprises a bipolar junction transistor having an emitter region corresponding to the first region and a collector region corresponding to the second region.

5. The method recited in claim 1 wherein the moveable element is not in contact with the first or second regions when in the position defining the select state.

6. The method recited in claim 1 wherein the moveable element is in contact with the first and second regions when in the position defining the select state.

7. The method recited in claim 6 wherein the first and second regions comprise electrically conductive regions.

8. The method recited in claim 1 further comprising performing changing the voltage and measuring the second region periodically.

9. The method recited in claim 8 further comprising periodically restoring a voltage to an electrode configured to provide an electrostatic force on the moveable element.

10. The method recited in claim 1 wherein changing the voltage of the first region comprises applying an ac voltage spike to the first region.

11. A MEMS device comprising:

a moveable element formed over a substrate and configured to move to a position defining a select state of the MEMS device upon activation of an electrode;

a sensing configuration having first and second regions formed within the substrate, wherein the first and second regions are electrically coupled when the moveable element is in the position and electrically uncoupled when the moveable element is not in the position; and a detector configured to indicate when the first and second regions of the sensing configuration are electrically coupled.

12. The MEMS device recited in claim 11 wherein the sensing configuration comprises a transistor.

13. The MEMS device recited in claim 12 wherein:

the sensing configuration comprises a field-effect transistor;

the first region comprises a source of the field-effect transistor; and the second region comprises a drain of the field-effect transistor.

14. The MEMS device recited in claim 12 wherein:

the sensing configuration comprises a bipolar junction transistor;

the first region comprises an emitter of the bipolar junction transistor; and the second region comprises a collector of the bipolar junction transistor.

15. The method recited in claim 11 wherein the moveable element is in contact with the first and second regions when in the position.

16. The MEMS device recited in claim 11 further comprising a dynamic refresh driver electrically coupled with the first region and configured to periodically provide an ac signal to the first region.

17. A microstructure for steering light, the microstructure comprising:
   a substrate;
   a structural linkage connected with the substrate and supporting a moveable element disposed to orient a reflective coating;
   an electrode disposed to provide an electrostatic force on the moveable element upon actuation; and
   a sensing configuration having first and second regions fanned within the substrate and that are electrically coupled only when the moveable element is in a position that defines a select state for the microstructure.

18. The microstructure recited in claim 17 wherein the sensing configuration comprises a transistor formed within the substrate.

19. The microstructure recited in claim 18 wherein:
   the sensing configuration comprises a field-effect transistor;
   the first region comprises a source of the field-effect transistor; and
   the second region comprises a drain of the field-effect transistor.

20. The microstructure recited in claim 18 wherein:
   sensing configuration comprises a bipolar junction transistor;
   the first region comprises an emitter of the bipolar junction transistor; and
   the second region comprises a collector of the bipolar junction transistor.

21. The microstructure recited in claim 17 wherein the moveable element is in contact with the first and-second regions when in the position.

22. The microstructure recited in claim 17 wherein the microstructure is one of a plurality of similar microstructures comprised by an array.

23. The microstructure recited in claim 22 wherein:
   the first region of each of the microstructures is electrically coupled with a dynamic refresh driver;
   the electrode of each of the microstructures is electrically coupled with the dynamic refresh driver; and
   the second regions of the microstructures are electrically coupled with one another.

24. The microstructure recited in claim 23 wherein the array is comprised by a wavelength router.

* * * * *